United States Patent
Wu et al.

(10) Patent No.: US 7,834,935 B2
(45) Date of Patent: Nov. 16, 2010

(54) SCART FAST BLANKING SIGNAL PROCESSING

(75) Inventors: Dongsheng Wu, Hainesport, NJ (US); Huijuan Liu, Bridgewater, NJ (US)

(73) Assignee: ATI Technologies, Inc., Markham, Ontario (CA)

( * ) Notice: Subject to any disclaimer, the term of this patent is extended or adjusted under 35 U.S.C. 154(b) by 1119 days.

(21) Appl. No.: 11/510,470

(22) Filed: Aug. 24, 2006

(65) Prior Publication Data

US 2008/0062321 A1    Mar. 13, 2008

(51) Int. Cl.
*H03M 1/12* (2006.01)
*H04N 5/46* (2006.01)
*H04N 5/455* (2006.01)
*H04N 9/74* (2006.01)

(52) U.S. Cl. ............... 348/572; 348/557; 348/728; 348/584

(58) Field of Classification Search ......... 348/572, 348/555, 557, 728, 501, 453, 726, 584; 725/139, 725/141, 151; 345/501, 519, 520; 341/155
See application file for complete search history.

(56) References Cited

U.S. PATENT DOCUMENTS

| | | | | |
|---|---|---|---|---|
| 4,789,862 | A * | 12/1988 | Jackson | 341/155 |
| 6,661,421 | B1 * | 12/2003 | Schlapp | 345/530 |
| 7,023,494 | B2 * | 4/2006 | Yun | 348/572 |
| 7,039,755 | B1 | 5/2006 | Helms | |
| 2003/0174224 | A1 * | 9/2003 | Dumont et al. | 348/263 |
| 2005/0140826 | A1 * | 6/2005 | Dumont et al. | 348/571 |
| 2006/0059380 | A1 | 3/2006 | Kimura | |

FOREIGN PATENT DOCUMENTS

| | | |
|---|---|---|
| EP | 1 187 492 | 3/2002 |
| EP | 1 389 872 | 2/2004 |
| WO | 03/085987 | 10/2003 |

OTHER PUBLICATIONS

Philips Semiconductors, "Data Sheet, TDA933xH Series, I²C-bus Controlled TV Display Processors", Preliminary Specification, Supersedes Data of May 8, 2000, (Jun. 4, 2002).

Swedish Standards Institution, "Domestic and Similar Electronic Equipment Interconnection Requirements—Peritelevision Connector", SS-EN 50049-1, (Mar. 27, 1998).

* cited by examiner

*Primary Examiner*—Victor Kostak
(74) *Attorney, Agent, or Firm*—Volpe and Koenig, P.C.

(57) ABSTRACT

A video receiver for SCART input includes an input configured to receive a composite video signal, RGB signals, and a switch-indicating signal, a first digitizer module coupled to the input and including a one-bit slicer configured to receive and convert the switch-indicating signal to a one-bit digital signal, the first digitizer further including a downconverter configured to convert the one-bit signal to a multi-bit digital signal with non-abrupt transitions between a logical zero and a logical one, and a combiner module configured to receive and combine indicia of the composite video signal and the RGB signals to produce a total video output signal as a function of the indicia of the multi-bit digital signal.

20 Claims, 6 Drawing Sheets

SCART FAST BLANKING SIGNAL PROCESSING

BACKGROUND

In television design with SCART (Syndicat des Constructeurs d'Appareils Radiorécepteurs et Téléviseurs) inputs, five signals are received via the input. These five signals comprise a composite video signal, R (red), G (green), B (blue) signals, and FB signal. The composite video signal includes both luma and chroma information. The R, G, and B signals provide red, green, and blue intensity information. The FB signal is a fast blanking signal (a.k.a. a fast switch signal) and is used to indicate whether to switch from using the composite video signal to the RGB signals, or vice versa, to provide video output information. Thus, the FB signal is an indicator for the SCART receiver to use the composite video signal or the RGB signals to produce video output, e.g., YUV, signals.

Existing techniques for using the FB signal to switch between using the composite video input and the RGB inputs are expensive and/or induce poor performance at the switching. One technique to switch between the composite video and the RGB inputs is to use a multi-bit analog-to-digital converter (ADC) for the FB signal. Using a multi-bit ADC is an expensive solution. Alternatively, a one-bit slicer may be used. Using a one-bit analog slicer, however, to induce a hard switch between the composite video input and the RGB inputs can result in performance degradation on the edges of the FB transitions (i.e., transitions from indicating to use the composite video to indicating to use RGB, and vice versa).

SUMMARY

In general, in an aspect, the invention provides a video receiver for SCART input, the receiver including an input configured to receive a composite video signal, RGB signals, and a switch-indicating signal, a first digitizer module coupled to the input and including a one-bit slicer configured to receive and convert the switch-indicating signal to a one-bit digital signal, the first digitizer further including a downconverter configured to convert the one-bit signal to a multi-bit digital signal with non-abrupt transitions between a logical zero and a logical one, and a combiner module configured to receive and combine indicia of the composite video signal and the RGB signals to produce a total video output signal as a function of the indicia of the multi-bit digital signal.

Implementations of the invention may include one or more of the following features. The one-bit slicer is configured to convert the switch-indicating signal to a first digital signal at a first sampling rate, the receiver further including a second digitizer module coupled to the input and configured to digitize the composite video signal and the RGB signals to produce digitized composite video and RGB signals at a second sampling rate, where the first sampling rate is substantially greater than the second sampling rate. The first sampling rate is a multiple of the second sampling rate. The multiple is 16.

Also, implementations of the invention may include one or more of the following features. The downconverter includes adders, counters, and multiplexers. The receiver further includes a second digitizer module coupled to the input and configured to digitize the composite video signal and the RGB signals to produce digitized composite video and RGB signals, and the first digitizer is configured to adjust a timing of a transition between a logical zero and a logical one of the one-bit digital signal relative to the digitized composite video and RGB signals. The first digitizer is configured to adjust timings of transitions of the one-bit signal from a logical zero to a logical one and from a logical one to a logical zero by different amounts. The receiver further includes an edge shaper filter configured to smooth edges of the transitions between the logical zero and the logical one of the multi-bit digital signal. The combiner module is configured to combine indicia of the composite video signal and the RGB signals to produce the total video output signal as a function of the indicia of the composite video signal, the indicia of the RGB signals, and the indicia of the multi-bit digital signal.

In general, in another aspect, the invention provides a method of processing RGB signals, a composite video signal, and a fast-blanking signal, the method including digitizing the fast-blanking signal using a one-bit slicer operating at a first sampling rate to produce a one-bit digital signal, digitizing the RGB signals and the composite video signal at a second sampling rate, the second sampling rate being substantially lower than the first sampling rate, downsampling the one-bit digital signal to produce a multi-bit digital signal having gradual transitions between logical zero and logical one, and combining indicia of the composite video signal and the RGB signals to produce a total video output signal as a function of a signal related to the multi-bit digital signal.

Implementations of the invention may include one or more of the following features. The downsampling reduces a frequency of the digitized fast-blanking signal by a factor of N and the multi-bit signal is an M-bit signal, where M and N are integers. The downsampling to produce the multi-bit digital signal includes filtering using an FIR filter with coefficients of (1, 2, 3, . . . , 15, 16, 15, . . . , 3, 2, 1)/256 and performing 8:1 downsampling using simple adders, counters, and multipliers. The method further includes converting the RGB signal and the composite video signal to a YUV-formatted RGB-YUV signal and a YUV-formatted composite-YUV signal, respectively, where the combining includes combining Z % of the composite-YUV signal with 100%-Z % of the RGB-YUV signal to produce the total video output signal. Z equals 100 times a value of the multi-bit signal normalized to have values between zero and one inclusive. The method further includes adjusting a timing of a transition between a logical zero and a logical one of at least one of the one-bit signal and the multi-bit signal relative to the digitized RGB signals. The method further includes adjusting a timing of a transition from a logical zero to a logical one, and from a logical one to a logical zero, of at least one of the one-bit signal and the multi-bit signal by different amounts relative to the digitized RGB signals.

In general, in another aspect, the invention provides a video decoder chip for use in conjunction with a display, the chip including R, G, B, composite video, and fast-blanking inputs configured to receive red (R), green (G), and blue (B) video signals, a composite video signal, and a fast-blanking signal, respectively, analog-to-digital converters coupled to the R, G, B, and composite video inputs, respectively, and configured to sample the R, G, and B signals at a first sampling rate, a one-bit slicer coupled to the fast-blanking input and configured to sample the fast-blanking signal at a second sampling rate, that is substantially higher than the first sampling rate, to produce a one-bit signal, a converter coupled to the one-bit slicer and configured to convert the one-bit signal with direct transitions between logical zero and logical one values to a multi-bit signal with tiered transitions between logical zero and logical one values, and a shaper device coupled to the converter and configured to smooth edges of the tiered transitions.

Implementations of the invention may include one or more of the following features. The video decoder chip further includes a blender module coupled to the analog-to-digital converters and the shaper device to receive the R, G, B, composite video, and fast-blanking signals and configured to: convert the R, G, and B signals into a combined RGB signal in a desired format, and to convert the composite video signal into the desired format; and blend a first percentage of the RGB signal in the desired format and a second percentage of the composite video signal in the desired format to form a total video signal, the first and second percentage being functions of values of the fast-blanking signal provided by the shaper device. The video decoder chip further includes at least one delay mechanism configured to delay at least one of the R, G, B, composite video, and fast-blanking signal such that the RGB signal in the desired format, the composite video signal in the desired format, and the fast-blanking signal received by the blender module are substantially aligned in time. The converter consists essentially of adders, multiplexers, and registers.

In accordance with implementations of the invention, one or more of the following capabilities may be provided. Smooth transitions between use of composite video input and RGB input using a SCART receiver can be provided inexpensively. Rising and falling edges of an FB signal can be digitally and independently adjusted in time. An FB signal can be converted to a multi-bit signal using a one-bit slicer and a downconverter comprising adders and counters.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for using an FB signal to transition between use of composite video input signals and RGB input signals. A SCART receiver includes a one-bit slicer that converts an incoming fast blanking signal to a one-bit signal that is over-sampled relative to the sampling of composite video input and RGB input signals. Rising and falling edges of the FB signal in the over-sampled one-bit form can be adjusted in time forward and/or backward independently of each other. A downconverter can convert the over-sampled one-bit signal into a less over-sampled multi-bit signal. Another downconverter can convert the multi-bit signal to the sampling rate of the composite input signal and the RGB signals. The multi-bit, downconverted signal transitions from one state of the FB signal to another state of the FB signal gradually. The gradually-transitioning signal can be used to indicate and induce a change of usage of the composite input signal and/or the RGB input signals for use in providing video output signal. The gradually-transitioning signal can be used to induce a blended transition from usage of the composite video input signal to the RGB input signals and vice versa. This receiver is exemplary, however, and not limiting of the invention as other implementations in accordance with the disclosure are possible.

Figure 1:
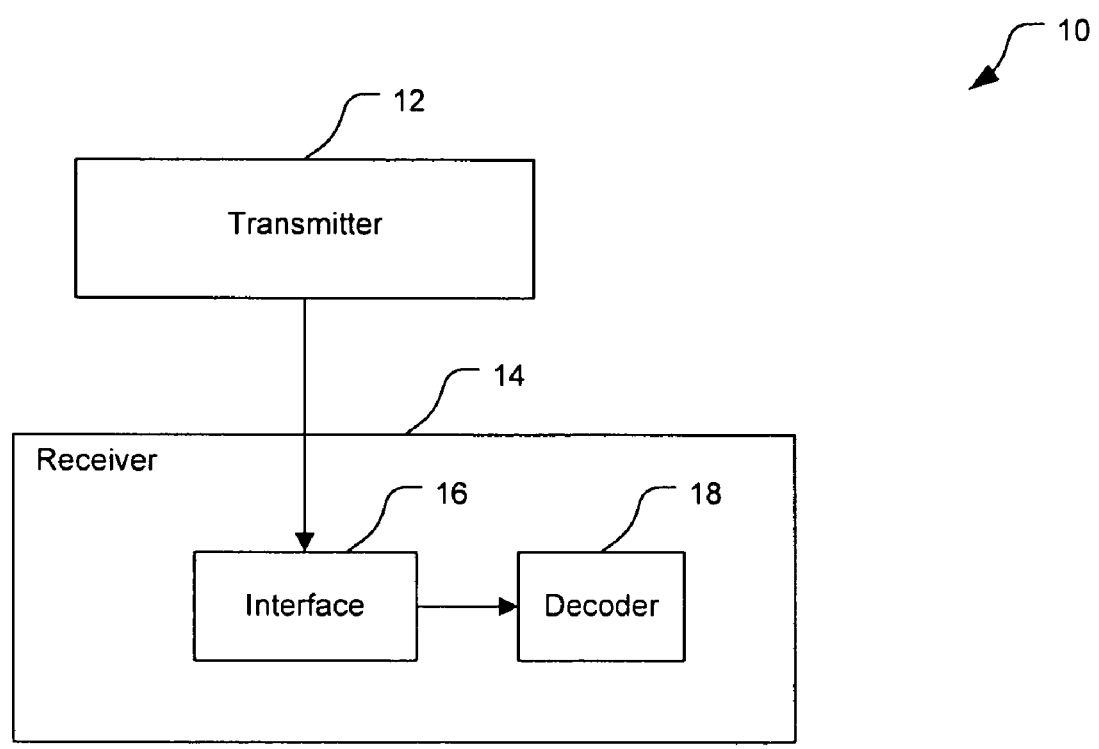
FIG. 1 is a block diagram of a video transmitter and a video receiver.

Referring to FIG. 1, a video system 10 includes a transmitter 12 and a SCART receiver 14. The transmitter 12 (e.g., a VCR) is configured to send video signals to the receiver 14 (e.g., a television), with the video signals including a composite video signal, RGB signals, and an FB signal. The receiver 14 includes an interface 16, a tuner 17, and a decoder 18. The interface 16 is configured to receive the composite video input signal, the RGB signals, and the FB signal. For example, the interface 16 can be a SCART connector. The tuner 17 is configured to adapt to the frequency of the incoming signals to help process these signals. The decoder 18 can be implemented as a semiconductor chip and is configured to decode the signals received by the interface 16. In particular, the decoder 18 is configured to process the composite video input signal and the RGB input signals to produce an output video signal, e.g., in YUV format. The decoder 18 is configured to transition between using the composite video signal and the RGB input signals to produce the video output signal. The decoder 18 can be implemented with hardware or with software (stored in memory) and hardware (e.g., a processor) to perform functions described above and below.

Figure 2:
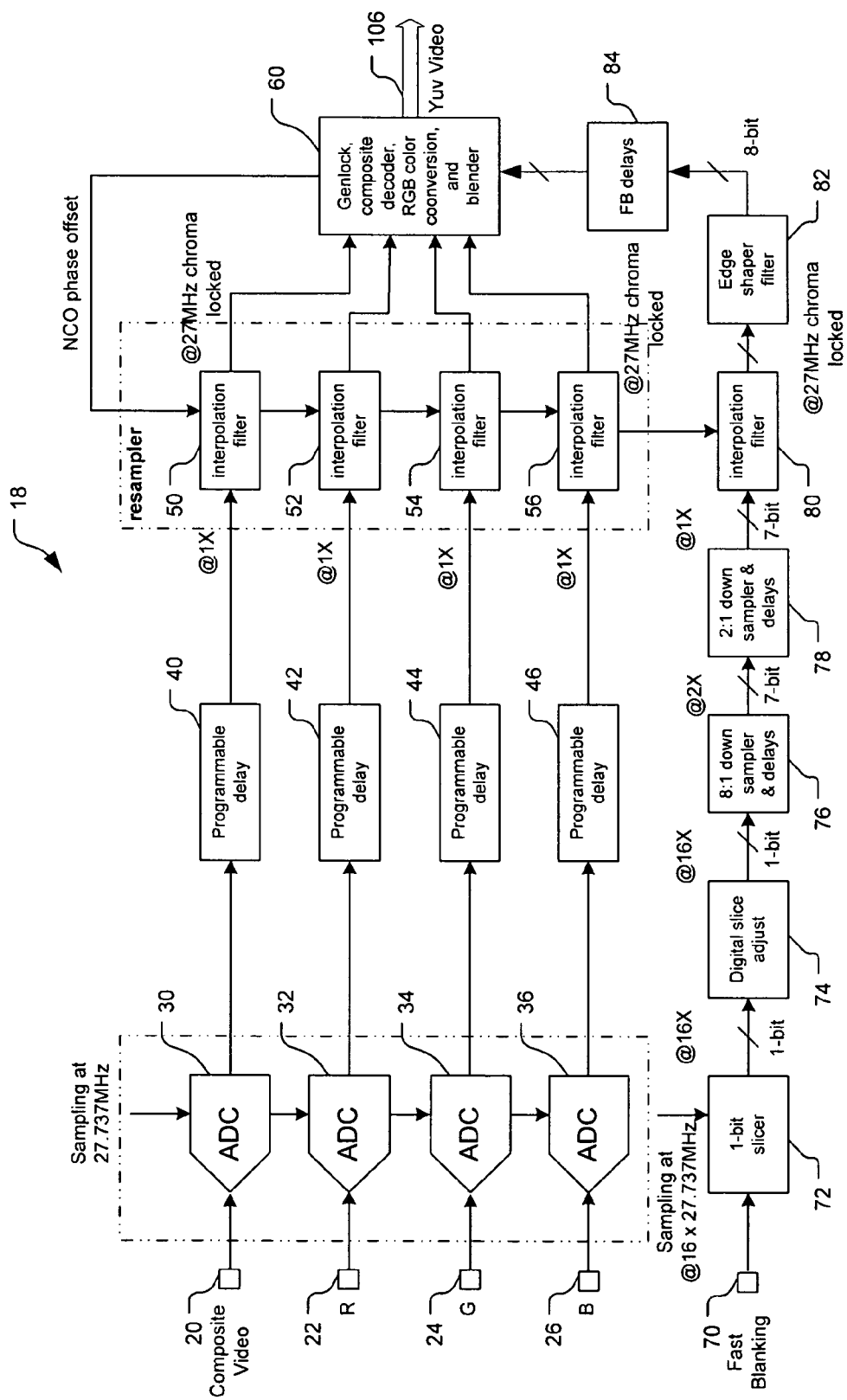
FIG. 2 is a block diagram of a decoder of the receiver shown in FIG. 1.

Referring to FIG. 2, the decoder 18 includes components for processing video input signals and for processing a fast blanking input signal. The decoder 18 includes a composite input 20, an R input 22, a G input 24, and a B input 26, configured to receive, respectively, a composite video input signal, and R, G, and B signals. The decoder 18 further includes a preliminary video processing section 102 and a fast blanking signal processing section 104. The section 102 is configured to process the composite video input signal and the RGB signals for use in producing a YUV video output signal 106. The section 104 is configured to process a received FB signal for use in controlling which of the composite video input signal and/or the RGB video input signals to use in producing the YUV video output signal 106.

The section 102 includes analog-to-digital converters (ADCs) 30, 32, 34, 36, programmable delays 40, 42, 44, 46, and interpolation filters 50, 52, 54, 56. The ADCs 30, 32, 34, 36 are configured to convert the composite video signal on the input 20 and the RGB signals on the inputs 22, 24, 26 from analog to digital signals. The ADCs 30, 32, 34, 36 have a sampling rate here of 27.737 MHz, although other sampling rates may be used. The programmable delays 40, 42, 44, 46 have variable delays that can be programmed as desired, however, preferably remain fixed once programmed. The delays 40, 42, 44, 46 provide respective delays corresponding to delay times introduced to the FB signal by components of the section 104 as described below. The interpolation filters 50, 52, 54, 56 are configured to resample the converted, delayed composite and RGB video signals to downconvert the sampling rate to be locked with the chroma carrier from the transmitter 12 (FIG. 1). Here, for example, the signal output by the filters 50, 52, 54, 56 is at 27 MHz. The filters 50, 52, 54, 56 are connected to a genlock, composite decoder, RGB color converter and blender module 60. The module 60, described more fully below, is configured to process the composite video and RGB video signals to produce the YUV output signal 106.

The section 104 includes an FB input 70, 1-bit slicer 72, a digital slice adjuster 74, an 8-to-1 downsampler 76, 2-to-1 downsampler 78, an interpolation filter 80, an edge shaper filter 82, and an FB delay module 84. Section 104 is configured to receive an FB signal at the FB input 70, convert the FB signal to a digital signal with non-abrupt transitions from low to high and high to low values, and to synchronize the FB signal with the processed composite video and RGB signals.

The 1-bit slicer 72 is configured to sample the FB signal received at the FB input 70 and to convert the FB signal to a digital signal. The 1-bit slicer 72 is configured to sample the incoming FB signal at a higher sampling rate than that used by the ADCs 30, 32, 34, 36. For example, here, the 1-bit slicer 72 is configured to sample the FB signal at 16 times (16×) the rate of the ADCs 30, 32, 34, 36, that is, 16 times 27.737 MHz. The 1-bit slicer 72 is configured to detect the voltage of the FB signal. The 1-bit slicer 72 is configured to provide an output of a logical one when the analog FB signal is higher than an upper threshold, and to output a logical zero when the analog FB signal is lower than a lower threshold. The upper and lower thresholds may be the same value or different values. Thus, the 1-bit slicer 72 is configured to receive an analog input signal and to output a 1-bit digital signal at 16 times the sampling frequency of the ADCs 30, 32, 34, 36 to the digital slice adjuster 74.

The digital slice adjuster 74 is configured to receive the 1-bit oversampled signal from the 1-bit slicer 72 and to adjust rising and falling edges of the 1-bit signal as desired. The digital slice adjuster 74 is preferably a register configured to shift in, one bit at a time, the value of the 1-bit signal received form the 1-bit slicer 72. The digital slice adjuster 74 is further configured to move a position of a rising edge or falling edge of the 1-bit signal by altering the output shift sequence from the register. To move the edge earlier in time, the portion(s) of the shift register in front of the portion of the shift register indicating the edge is (are) removed and/or the bit indicating the edge is output earlier in time than would be without the adjustment. To adjust the rising edge earlier and the falling edge later, a (fixed) delay can be introduced by the digital slice adjuster 74, and this delay compensated relative to the composite and RGB signals by the delays 40, 42, 44, 46.

Figure 3:
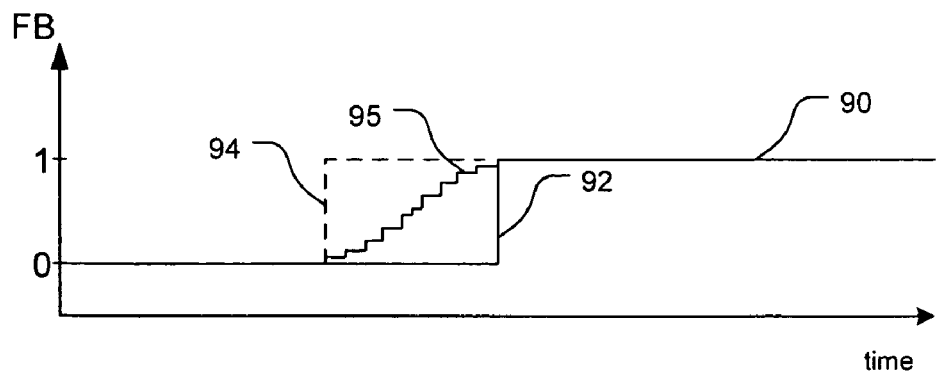
FIGS. 3-4 are signal diagrams of a fast-blanking signal illustrating rising and falling transitions, respectively, between logical levels.
Figure 4:
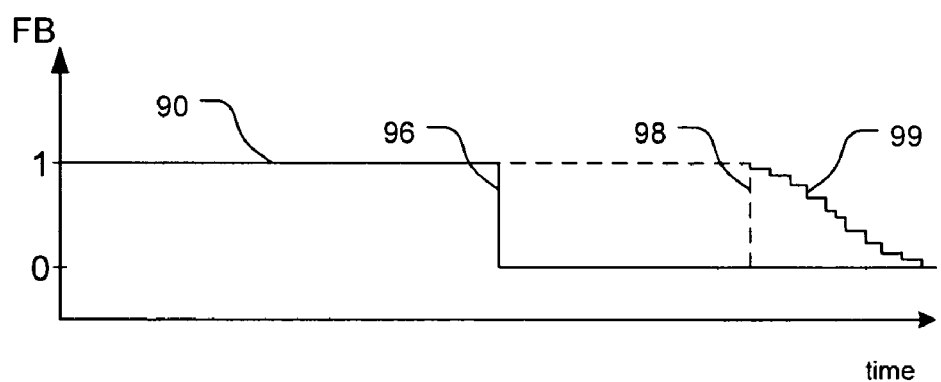

Referring also to FIG. 3, an output signal 90 provided by the digital slice adjuster 74 shows a rising edge 92 of the FB signal before adjustment by the digital slice adjuster 74. After adjustment, the signal 90 has a rising edge 94 earlier in time. Further, referring also to FIG. 4, the output signal 90 has a falling edge 96 before adjustment, and a falling edge 98 after adjustment. The digital slice adjuster 74 is configured to be programmed to adjust or alter the location in time of the rising edge and falling edge of the digital signal 90. The amount of adjustment, either forward or backward, for either of the rising edge or the falling edge of the signal 90 can be adjusted. Further, the rising edge alteration and the falling edge alteration can be different and set independently. The adjustments for the rising and falling edges are preferably programmed into the digital slice adjuster 74 and are fixed thereafter. As shown in FIGS. 3 and 4, the rising edges 92, 94 and the falling edges 96, 98 are abrupt transitions. Further, the signal 90 output by the digital slice adjuster 74 is a 1-bit signal at the 16× sampling rate.

The 8-to-1 downconverter 76 is connected to the digital slice adjuster 74 and configured to receive the output signal from the digital slice adjuster 74, and to reduce the sampling rate of the received signal and to convert the received signal into a multi-bit signal with gradual transitions between logic levels. The 8-to-1 downconverter 76 is configured to reduce the sampling rate of the incoming signal, here by a factor of eight such that the converter 76 is configured to output a signal at 2× the sampling rate of the ADCs 30, 32, 34, 36. Further, the 8-to-1 downconverter is configured to provide a 7-bit signal at this reduced sampling frequency. Further, the downconverter 76 is configured to provide a fine-tuning delay to the processed FB signal. As the incoming signal is at 16 times the sampling frequency, the downconverter 76 can provide a shift register delay corresponding to a pre-programmed number of clock cycles that will provide a relatively fine-tuned delay of $1/16^{th}$ of an ADC sampling cycle. This delay adjusts the timing of the processed FB signal relative to the composite video and RGB video signals. The 8-to-1 downconverter 76 can be implemented with an FIR filter with coefficients of (1, 2, 3 ..., 15, 16, 15 ..., 3, 2, 1)/256, which is advantageous for anti-aliasing and implementation.

Figure 5:
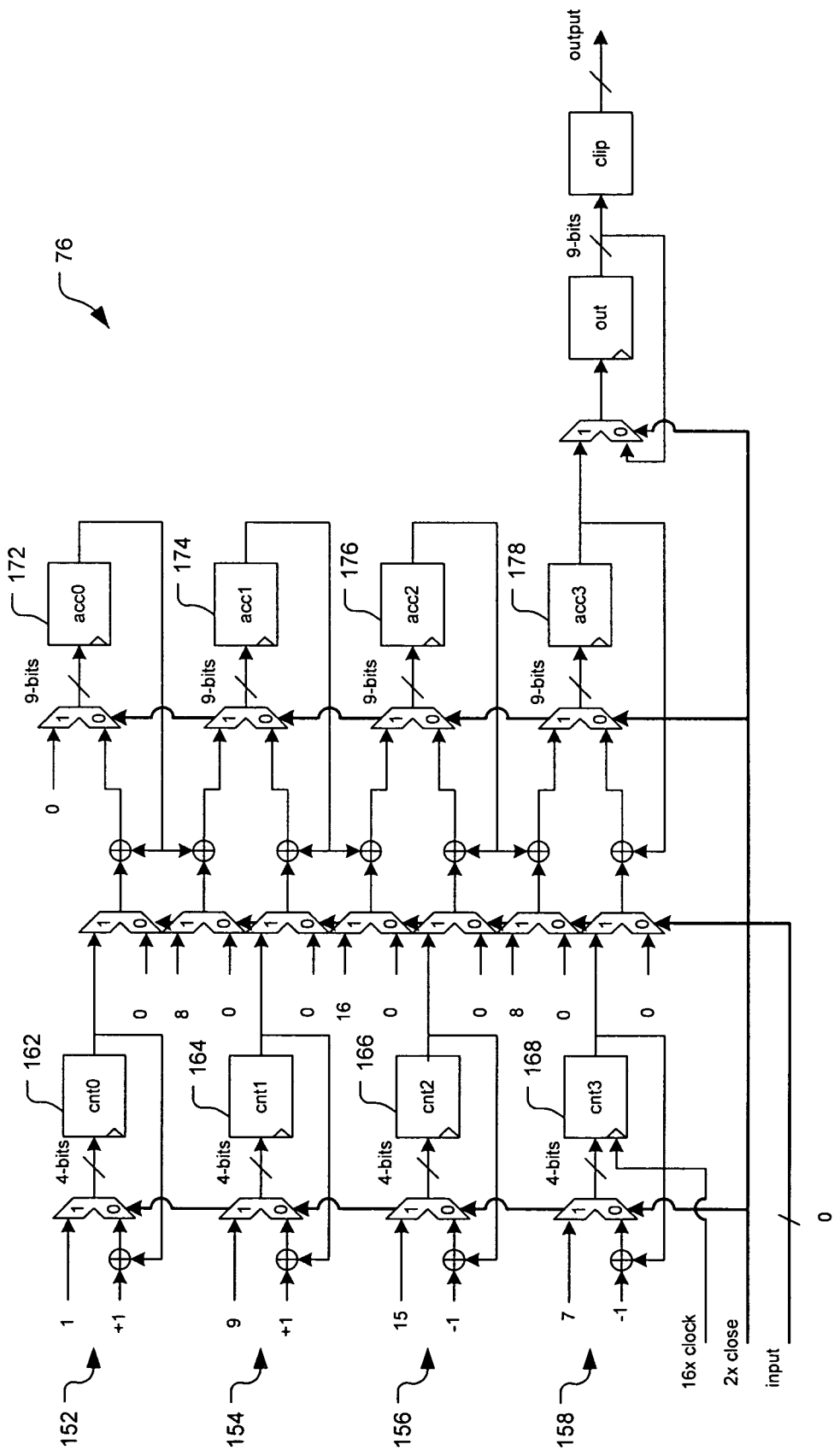
FIG. 5 is a block circuit diagram of a downconverter of the decoder shown in FIG. 2.

Referring also to FIG. 5, the 8-to-1 downconverter 76 can be implemented with adders, multiplexers, and counters. Notably, the downconverter 76 shown in FIG. 5 does not contain any multiplier. The inputs of the downconverter 76 are either 0 or 1. The downconverter 76 is, here, a triangular FIR filter, with coefficient values gradually increasing by 1 or decreasing by 1. Further, the output of the downconverter 76 is decimated by eight. With decimation by eight and a filter length of 31, the filter is divided into four sections 152, 154, 156, 158 each covering up to eight input samples. The sections 152, 154, 156, 158 include respective counters 162, 164, 166, 168 and accumulators 172, 174, 176, 178. For the sections 152, 154 with incremental coefficient values, the counters 162, 164 are incremented by 1, and their outputs added to the accumulators 172, 174 if a corresponding input sample equals 1. For the sections 156, 158 with decremental coefficient values, the counters 166, 168 are decremented by 1, and their outputs added to the accumulators 176, 178 if the corresponding input sample equals 1. Every eight clock cycles, the counters 162, 164, 166, 168 are reset to a set of initial values (1, 9, 15, and 7 as shown) and the values of the accumulators 172, 174, 176, 178 propagate from one to another with added values of 0, 8, 16, 8, respectively. This configuration corresponds to an FIR filter defined as $y(n) = \mathrm{sum}(x(i)*f(n-i))$ over i where $x(i)$ is the value of input samples (0/1), and $f(i)$ the filter coefficients (time shifted, $f(0)=16/256$). The function $y(n)$ is downsampled by eight.

The downconverter 76 as shown is configured to transform the digitized FB signal 90 from the abrupt rising edge shape 92 to a more gradual rising edge 95 as shown in FIG. 3, and to transform the falling edge 96 from an abrupt transition to a more gradual transition 99 as shown in FIG. 4. Simplified transitions showing a reduced number of steps in the rising edge 95 and the falling edge 99 are shown as there are too numerous steps in the actual respective edges 95, 99 to show. FIGS. 3 and 4 show the gradual edges 95, 99 before the 8:1 downconversion.

The downconverter 76 is configured to convert abrupt transitions from a logical zero to a logical one and from a logical one to a logical zero to stepped or tiered non-abrupt transitions. The downconverter 76 is actuated by a transition between a logical zero and a logical one and proceeds to count up or down, as appropriate, by ones between its minimum and maximum output values of 0 and 127. The downconverter 76 is configured to produce an M-bit digital signal with transitions between a logical zero and a logical one in 31 steps (the length of the FIR filter if the input logic remains constant). Thus, the downconverter 76 is configured to convert an abrupt sequence of logical values 0, 1 into a non-abrupt sequence of values of (0, 1, 3, 6, 10, 15 . . . 253, 255, 256)/256 and an abrupt sequence of logical values 1, 0 into a non-abrupt sequence of values of (256, 255, 253, . . . 15, 10, 6, 3, 1, 0)/256.

Referring to FIG. 2 again, the 2-to-1 downconverter 78 is connected to the 8-to-1 downconverter 76 and configured to receive the 7-bit, 2× output signal from the downconverter 76 and to further downconvert this signal to the ADCs' sampling frequency. The downconverter 78 adjusts the sampling frequency of the processed FB signal from two times the ADC sampling frequency to one times (1×) the ADC sampling frequency. The downconverter 78 further provides for coarse timing delay of the processed FB signal, as the incoming signal to the downconverter 78 is at two times the ADC sampling frequency. The downconverter 78 can provide delays in multiples of shift registers corresponding to clock cycles. As the clock cycle corresponds with two times the ADC sampling frequency, as opposed to a higher multiple of the sampling frequency, the adjustment of one or more shift registers provides a coarse level of delay of one-half of an ADC sampling cycle.

The delay introduced by the downconverter 78 affects the timing of the processed FB signal relative to the composite video signal and the RGB video signals. The downconverter 78 is configured to output a 7-bit signal at 1× of the ADC sampling rate that is in alignment with the composite video and RGB data channels in time.

The interpolation filter 80 is connected to the downconverter 78, configured to receive the output of the downconverter 78, and to process this signal to down convert or otherwise adjust the sampling frequency of the signal to be genlocked or chroma locked to the frequency of the chroma component of the composite video signal. The filter 80 uses a phase offset received from the module 60 to adjust the frequency of the processed FB signal to output a signal to the edge shaper filter 82 that is at the chroma locked frequency, here 27 MHz. The interpolation filter 80 is a resampler with a poly-phase interpolation filter. The same NCO (numeric crystal oscillator) phase offset is applied to the interpolation filter 80 as the interpolation 50, 52, 54, 56. The output of the interpolation filter is aligned with the output of the interpolation filters 50, 52, 54, 56 and at the same frequency.

Figure 6:
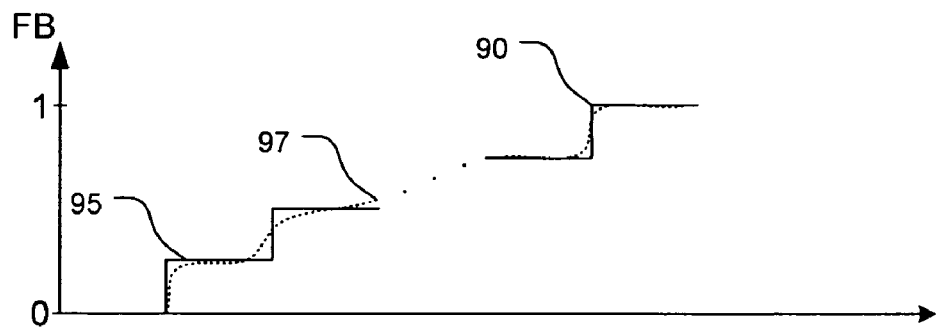
FIG. 6 is a signal diagram of stepped rising transitions of a fast-blanking signal with sharp and smoothed edges.
Figure 7:
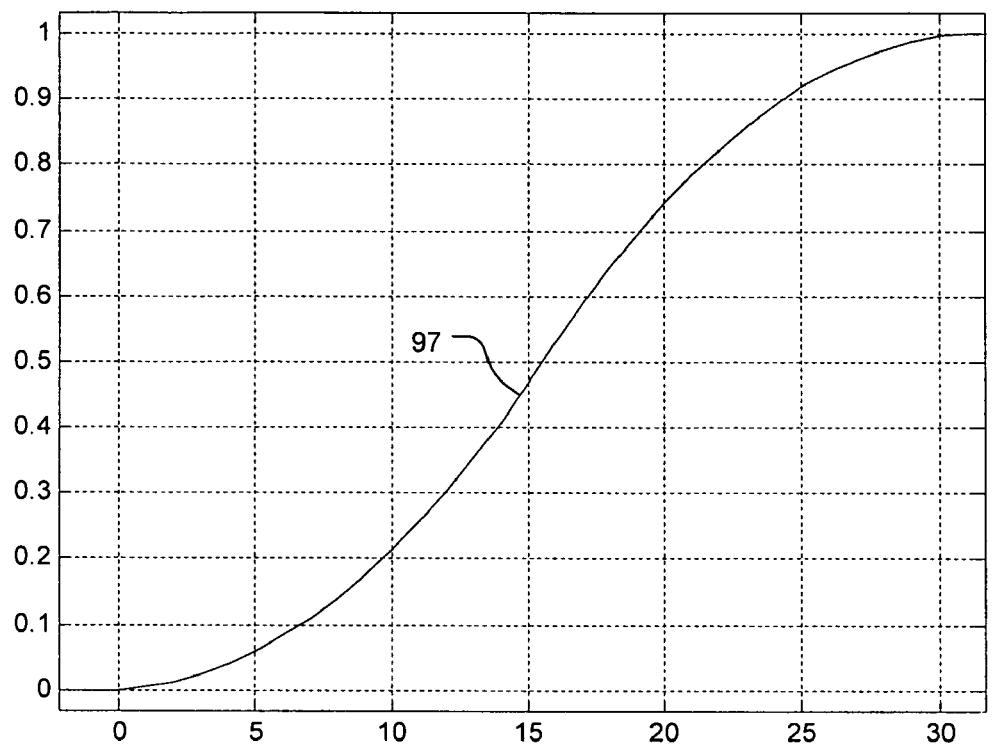
FIGS. 7-8 are signal diagrams of smoothed rising and falling transitions of a fast-blanking signal.
Figure 8:
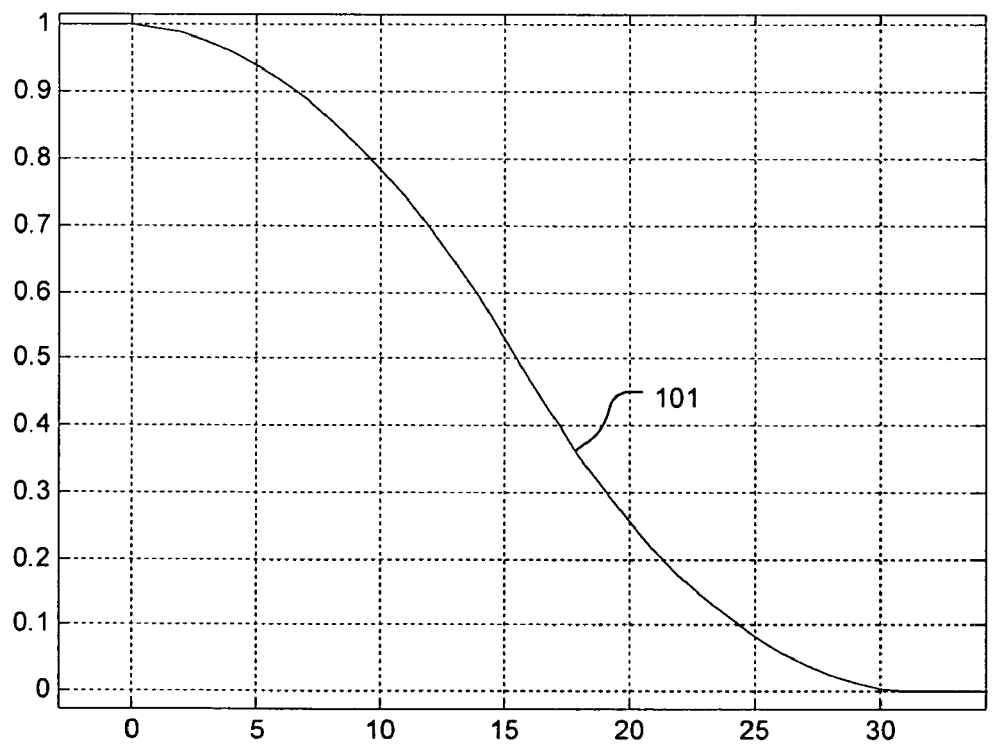
Figure 9:
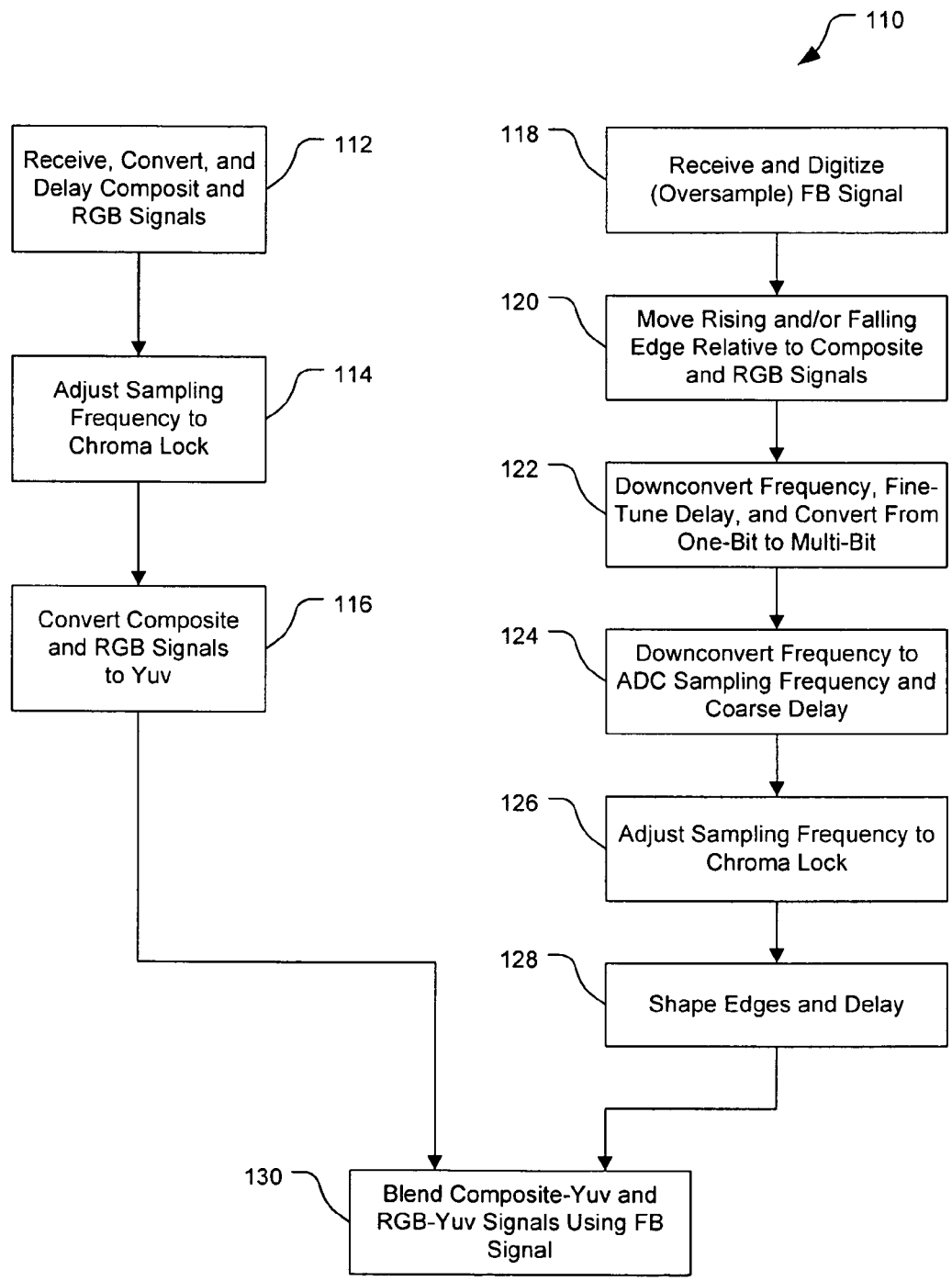
FIG. 9 is a block flow diagram of a process of processing and blending a composite video signal and RGB signals as a function of a fast-blanking signal.

The edge shaper filter 82 is connected to the interpolation filter 80 and configured to receive and modify the edge shapes of transitions in the processed FB signal from the interpolation filter 80. Referring also to FIGS. 6-8, the edge shaper filter 82 is configured to modify the signal 90, and in particular the rising edge 95 and the falling edge (not shown) to smooth the transition 95. The filter 82 is configured to round the corners in the transition 95 to produce smoothed transitions 97, 101 as shown. The edge shaper filter 82 comprises an FIR filter to adjust the shape of the signal 90 in accordance with programmed FIR filter parameters. These parameters may be programmed as desired to adjust the shape of the signal 90, in particular the transitions, as desired.

The FB delay module 84 is configured to introduce delay to the processed FB signal to align the processed FB signal with the YUV output video signal 106. The delay module 84 introduces delays to accommodate for the delays introduced by the video processing of the module 60 to convert the composite video signal and the RGB signals to YUV format.

The blender module 60 is configured to determine an NCO phase offset to provide to the interpolation filters 50, 52, 54, 56, 80, to decode the composite video signal and the RGB signals, and to convert these signals to the YUV output, including blending the decoded signals as appropriate. The module 60 is configured to analyze the composite video signal received on the input 20 for the chroma frequency, that is, the frequency of the chroma portion of the composite video signal. The module 60 determines the NCO phase offset to simulate the crystal of the transmitter 12 (FIG. 1) and provides this phase offset to the filters 50, 52, 54, 56, 80 for use in converting the composite video signal, the RGB signals, and the processed FB signal to the frequency of the chroma portion of the composite video signal. The module 60 is further configured to convert the composite video signal to YUV format and to convert the RGB video input signals to the YUV format. The module 60 is further configured to combine the converted composite video signal in the YUV format with the RGB video signals in the YUV format.

The module 60 is configured to use the processed FB signal received from the FB delay module 84 to combine or blend the YUV-formatted composite video signal and the YUV-formatted RGB video signals. The module 60 provides the total video output signal 106 as a function of the composite video signal and the RGB video signals and the processed FB signal. Although many functions can be used, preferably, the module 60 provides the total video output signal 106 according to:

$$\text{output} = FB \cdot \text{comp}_{YUV} + (1-FB) \cdot RGB_{YUV} \quad (1)$$

In this equation, $\text{comp}_{YUV}$ is the composite video signal in YUV format, $RGB_{YUV}$ is the RGB signals in YUV format, FB represents the processed FB signal. In Equation (1), FB is valued between zero and one. This can be viewed as combining Z % of the composite signal in YUV format with 100%-Z % of the RGB signal in YUV format, where Z equals 100 times a value of the multi-bit signal normalized to have values between zero and one inclusive.

Referring to FIG. 7, with further reference to FIGS. 1-6, a process 110 for processing and blending the composite video input signal and the RGB video input signals comprises the stages shown. The process 110, however, is exemplary only and not limiting as the process 110 may be altered, e.g., by having stages added, removed, or rearranged.

At stage 112, the composite video signal and the RGB video signals are received and digitized. The received signals are digitized by the ADCs 30, 32, 34, 36 at, here, a sampling rate of 27.737 MHz. Further, the digitized signals are delayed by the programmable delays 40, 42, 44, 46 to accommodate for delays in processing the received FB signal as discussed below.

At stage 114, the delayed, digitized signals are resampled to achieve chroma lock. The delayed, digitized signals are resampled by the interpolation filters 50, 52, 54, 56, using the NCO phase offset from the module 60 to adjust the sampling frequency to the chroma frequency of the composite video signal. For example, here, the outputs of the interpolation filters 50, 52, 54, 56 are at 27 MHz.

At stage 116, the composite video and RGB video signals are converted to YUV format. The module 60 converts the video signals in accordance with known algorithms to put the composite video signal and the RGB video signals into respective, separate YUV signals.

At stage 118, the FB signal is received concurrently with the composite video signal and the RGB video signals and is over-sampled to digitize the FB signal. The received FB signal is over-sampled relative to the sampling of the composite video and RGB video signals. Here, the FB signal is sampled at 16 times (16×) the ADC sampling rate by the 1-bit slicer 72. The 1-bit slicer outputs a 1-bit signal at 16× sampling.

At stage 120, the 1-bit, 16× FB signal is processed to adjust or move the rising and/or falling edges of the FB signal relative to the composite video and RGB video signals. The rising and/or falling edges are moved in time using the digital slice adjuster 74 in accordance with a programmed amount for the rising edge and a programmed amount for the falling edge respectively. The rising and/or falling edge is moved in time in accordance with a multiple of clock cycles based on a number of positions of the shift register that are added or skipped in the digital slice adjuster 74 for the respective edge. The rising and falling edges are adjusted independently of each other, including possibly not being adjusted at all.

At stage 122, the 16×, 1-bit signal output by the digital slice adjuster 74 is down converted, delayed and changed from a 1-bit to a multi-bit signal. The 8-to-1 downconverter 76 down converts the received 16×, 1-bit signal by a factor of 8 to yield a 2× signal. Further, the downconverter 76 converts the 1-bit signal into a 7-bit signal using the circuit shown in FIG. 5. The downcoverter 76 produces the gradual transitions 95, 99 as a result of the low-pass filtering. Further, the converter 76 introduces fine delay to the processed FB signal to help insure alignment with the composite video and RGB signals.

At stage 124, the 2-to-1 downconverter 78 receives the 2×, 7-bit signal from the 8-to-1 downconverter 76 and further down converts the sampling frequency of the received signal. The downconverter 78, here a 2-to-1 downconverter, down converts the received signal by a factor of two to yield an output signal at one times (1×) the ADC sampling rate. This signal is also a multi-bit, here 7-bit, signal. The downconverter 78 further introduces coarse delay as appropriate to help ensure alignment of the processed FB signal and the composite video and RGB video signals.

At stage 126, the sampling rate is further adjusted. The interpolation filter 80 uses the NCO phase offset from the module 60 to adjust the sampling frequency of the processed FB signal to match the chroma frequency of the composite video signal, here 27 MHz.

At stage 128, the edge shaper filter 82 and the FB delay module 84 adjust the shape of the processed FB signal 90 and introduce appropriate delay. The filter 82 modifies the shape of the transitions 95, 99 of the signal 90 to smooth the transitions, e.g., to form the transition 97 shown in FIG. 6. The delay module 84 introduces a delay to compensate for the processing to convert the composite video signal and the RGB video signals to YUV format.

At stage 130, the module 60 blends the composite YUV signal and the RGB YUV signal to yield the YUV video output signal 106. The module 60 uses the value of the FB signal to aggregate the composite video signal and the RGB video signal in YUV format into the video output signal 106. When the FB signal is 0-valued (a logical 0), only the RGB signal in YUV format is used for the output signal 106 and when the processed FB signal is a logical 1 value, then only the composite video signal in YUV format is used as the output signal 106. When the processed FB signal has a value between a logical 0 and a logical 1, then the video output signal 106 is a blended composite of the composite video and RGB video signals. Here, the module 60 combines the composite video signal and the RGB YUV signal in accordance with Equation (1) to yield the total video output signal 106.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while the discussion above noted that the abrupt transitions between logical zero and logical one in the FB can be adjusted in time relative to the RGB and composite video signals, the gradual FB transitions can also, or alternatively, be adjusted in time relative to the RGB and composite video signals.

Further, while the description above refers to the invention, the description may include more than one invention.

What is claimed is:

1. A video receiver for SCART input, the receiver comprising:
    an input configured to receive a composite video signal, RGB signals, and a switch-indicating signal;
    a first digitizer module coupled to the input and comprising a one-bit slicer configured to receive and convert the switch-indicating signal to a one-bit digital signal, the first digitizer further comprising a downconverter configured to convert the one-bit signal to a multi-bit digital signal with non-abrupt transitions between a logical zero and a logical one; and
    a combiner module configured to receive and combine indicia of the composite video signal and the RGB signals to produce a total video output signal as a function of the indicia of the multi-bit digital signal.

2. The receiver of claim 1 wherein the one-bit slicer is configured to convert the switch-indicating signal to a first digital signal at a first sampling rate, the receiver further comprising a second digitizer module coupled to the input and configured to digitize the composite video signal and the RGB signals to produce digitized composite video and RGB signals at a second sampling rate, wherein the first sampling rate is substantially greater than the second sampling rate.

3. The receiver of claim 2 wherein the first sampling rate is a multiple of the second sampling rate.

4. The receiver of claim 3 wherein the multiple is 16.

5. The receiver of claim 1 wherein the downconverter comprises a plurality of adders, a plurality of counters, and a plurality of multiplexers.

6. The receiver of claim 1 further comprising a second digitizer module coupled to the input and configured to digitize the composite video signal and the RGB signals to produce digitized composite video and RGB signals, and wherein the first digitizer is configured to adjust a timing of a transition between a logical zero and a logical one of the one-bit digital signal relative to the digitized composite video and RGB signals.

7. The receiver of claim 1 wherein the first digitizer is configured to adjust timings of transitions of the one-bit signal from a logical zero to a logical one and from a logical one to a logical zero by different amounts.

8. The receiver of claim 1 further comprising an edge shaper filter configured to smooth edges of the transitions between the logical zero and the logical one of the multi-bit digital signal.

9. The receiver of claim 1 wherein the combiner module is configured to combine indicia of the composite video signal and the RGB signals to produce the total video output signal as a function of the indicia of the composite video signal, the indicia of the RGB signals, and the indicia of the multi-bit digital signal.

10. A method of processing RGB signals, a composite video signal, and a fast-blanking signal, the method comprising:
    digitizing the fast-blanking signal using a one-bit slicer operating at a first sampling rate to produce a one-bit digital signal;
    digitizing the RGB signals and the composite video signal at a second sampling rate, the second sampling rate being substantially lower than the first sampling rate;

downsampling the one-bit digital signal to produce a multi-bit digital signal having gradual transitions between logical zero and logical one; and combining indicia of the composite video signal and the RGB signals to produce a total video output signal as a function of a signal related to the multi-bit digital signal.

11. The method of claim 10 wherein the downsampling reduces a frequency of the digitized fast-blanking signal by a factor of N and the multi-bit signal is an M-bit signal, where M and N are integers.

12. The method of claim 10 wherein the downsampling to produce the multi-bit digital signal comprises filtering using an FIR filter with coefficients of (1, 2, 3, . . . , 15, 16, 15, . . . , 3, 2, 1)/256 and performing 8:1 downsampling using simple adders, counters, and multipliers.

13. The method of claim 10 further comprising converting the RGB signal and the composite video signal to a YUV-formatted RGB-YUV signal and a YUV-formatted composite-YUV signal, respectively, wherein the combining comprises combining Z % of the composite-YUV signal with 100%-Z % of the RGB-YUV signal to produce the total video output signal.

14. The method of claim 13 wherein Z equals 100 times a value of the multi-bit signal normalized to have values between zero and one inclusive.

15. The method of claim 10 further comprising adjusting a timing of a transition between a logical zero and a logical one of at least one of the one-bit signal and the multi-bit signal relative to the digitized RGB signals.

16. The method of claim 10 further comprising adjusting a timing of a transition from a logical zero to a logical one, and from a logical one to a logical zero, of at least one of the one-bit signal and the multi-bit signal by different amounts relative to the digitized RGB signals.

17. A video decoder chip for use in conjunction with a display, the chip comprising:

R, G, B, composite video, and fast-blanking inputs configured to receive red (R), green (G), and blue (B) video signals, a composite video signal, and a fast-blanking signal, respectively;

analog-to-digital converters coupled to the R, G, B, and composite video inputs, respectively, and configured to sample the R, G, and B signals at a first sampling rate;

a one-bit slicer coupled to the fast-blanking input and configured to sample the fast-blanking signal at a second sampling rate, that is substantially higher than the first sampling rate, to produce a one-bit signal;

a converter coupled to the one-bit slicer and configured to convert the one-bit signal with direct transitions between logical zero and logical one values to a multi-bit signal with tiered transitions between logical zero and logical one values; and a shaper device coupled to the converter and configured to smooth edges of the tiered transitions.

18. The video decoder chip of claim 17 further comprising a blender module coupled to the analog-to-digital converters and the shaper device to receive the R, G, B, composite video, and fast-blanking signals and configured to:

convert the R, G, and B signals into a combined RGB signal in a desired format, and to convert the composite video signal into the desired format; and blend a first percentage of the RGB signal in the desired format and a second percentage of the composite video signal in the desired format to form a total video signal, the first and second percentage being functions of values of the fast-blanking signal provided by the shaper device.

19. The video decoder chip of claim 18 further comprising at least one delay mechanism configured to delay at least one of the R, G, B, composite video, and fast-blanking signal such that the RGB signal in the desired format, the composite video signal in the desired format, and the fast-blanking signal received by the blender module are substantially aligned in time.

20. The video decoder chip of claim 17 wherein the converter consists essentially of adders, multiplexers, and registers.

* * * * *